Patented Nov. 1, 1932

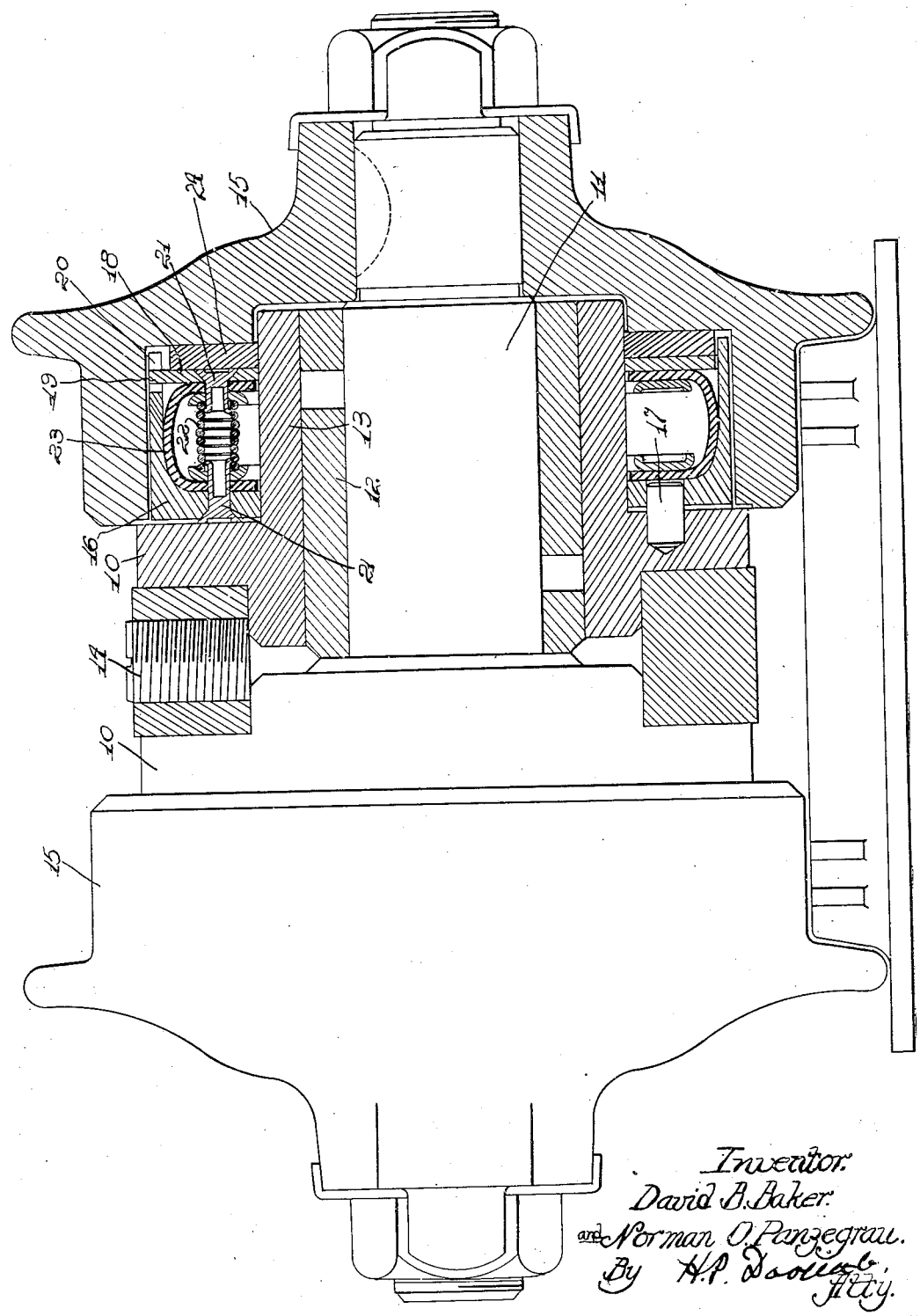

1,886,147

UNITED STATES PATENT OFFICE

DAVID B. BAKER AND NORMAN O. PANZEGRAU, OF CHICAGO, ILLINOIS, ASSIGNORS TO INTERNATIONAL HARVESTER COMPANY, A CORPORATION OF NEW JERSEY

OIL AND DIRT SEAL FOR TRACTOR TRUCK ROLLERS

Application filed July 9, 1930. Serial No. 466,869.

This invention relates to oil and dirt seals for use especially in connection with the truck rollers used in the truck frames of endless track type driving units.

These rollers in the type of tractor mentioned are exposed in their operation to dirt which works into the bearings and shafting upon which the truck rollers turn, causing highly objectionable wear. In addition to this, it is also a difficult problem to maintain oil on the bearings for these truck rollers. Accordingly, it is the object of this invention to provide an improved oil seal and dirt excluding means for a construction of the kind stated.

This desirable object may be achieved in the form of the invention herein chosen for the purposes of illustration, and, in the sheet of drawing, the single figure is a plan view, partly in section, through one of the truck roller mountings.

A non-rotatable journal part 10 of the roller truck is shown, in which is rotatably journaled a shaft 11 operating in a bushing 12 fitted into a hub extension 13 of the non-rotatable journal part 10. A fitting 14 is provided in the journal part 10 to receive an oil fitting for supplying oil through appropriate passage-ways to the shaft 11 and bushing 12. A truck wheel 15 is keyed and made fast to the shaft 11 to turn therewith.

The problem presented in these constructions is to prevent oil leakage and to exclude dirt from the bearing, so that objectionable wear cannot take place. Accordingly the structure now to be described is provided.

It will be noted that the inner face of the wheel 15 is hollowed out to provide a space around the hub 13 in which space is arranged an inner pressure ring member 16 in the form of a cup, which pressure ring is held against rotation by means of a pin lock 17. This lock is loose to permit of endwise sliding movement of the pressure ring. An outer pressure ring 18 is also provided in the form of a disk, which has a tongue extension 19 fitting into a groove 20 in the cup part of the inner pressure ring 16, so that the disk 18 may have endwise movement, but will be held against rotation. Both the inner and outer pressure members carry circumferentially spaced, aligned studs 21 for carrying one or more springs 22, which push outwardly against a diaphragm 23 channel shaped in cross section, as shown, so that the diaphragm presents two parts, one engaging the inner pressure ring and the other engaging the outer pressure ring. The bight of the channel in the diaphragm obviously serves as a seal to prevent dust from getting inside of the diaphragm. The pressure ring 18 clamps a leather packing ring 24 against the wheel 15, as shown.

In operation, it will be seen that, if any relative movement takes place between the stationary parts and the turning wheel 15, the springs 22 function in a manner to cause the outer pressure ring 19 to push against the packing ring 24 at all times and effectively seal any crevices or spaces that might occur. The bight of the diaphragm channel is sufficiently great to permit this following action. Accordingly, a yielding seal is provided which effectively acts to retain oil on the bearing against leakage to the outside and, conversely, acts to prevent ingress of dirt.

The seal is effective even though there may be an eccentric motion set up due to wear between the stationary and rotating members. The seal is so designed that it will operate satisfactorily under this condition, as well as a condition of a limited amount of wobble between the two parts.

From this description it must now be obvious that an effective seal has been provided for the purposes stated, which achieves all of the objects heretofore recited.

It is the intention to cover all such immaterial changes of the illustrative example of the invention herein shown which do not depart from the spirit of the invention as defined in the following claims.

What is claimed is:

1. A seal structure between a stationary journal hub part and a wheel rotatable with a shaft passed through said journal hub part, said wheel having a rim overhanging and extending around the journal hub part in spaced relation to leave an annular space in which the seal structure is located, the seal structure comprising an inner pressure member surrounding the hub part, said inner pressure member provided with a rim arranged inside the wheel rim, an outer pressure member slidably surrounding the hub part and spaced laterally of the inner pressure member on the hub part, a packing element between a face of the wheel and the inner pressure member, flexible sealing means connected between the inner and outer pressure members, means to prevent rotation of said pressure members, and circumferentially spaced springs between the two pressure members to slide the outer pressure member away from the inner pressure member to force the packing into sealing engagement with the wheel face.

2. A seal structure between a stationary journal hub part and a wheel rotatable with a shaft passed through said journal hub part, said wheel having a rim overhanging and extending around the journal hub part in spaced relation to leave an annular space in which the seal structure is located, the seal structure comprising an inner pressure member surrounding the hub part, said inner pressure member being cup shaped to provide a rim arranged inside the wheel rim, an outer pressure member slidably surrounding the hub part and spaced laterally of the inner pressure member on the hub part, a packing element between a face of the wheel and the inner pressure member, an annular flexible channel shaped sealing diaphragm connected between the inner and outer pressure members, means to prevent rotation of said pressure members, and means to slide the outer pressure member away from the inner pressure member to force the packing into sealing engagement with the wheel face, the bight of the diaphragm having sealing contact with the inner face of the rim of the cup shaped inner pressure member.

3. A seal structure between a stationary journal hub part and a wheel rotatable with a shaft passed through said journal hub part, said wheel having a rim overhanging and extending around the journal hub part in spaced relation to leave an annular space in which the seal structure is located, the seal structure comprising an inner pressure member surrounding the hub part, said inner pressure member being cup shaped to provide a rim arranged inside the wheel rim, an outer pressure member slidably surrounding the hub part and spaced laterally of the inner pressure member on the hub part, a packing element between a face of the wheel and the inner pressure member, a sealing annulus of U-shape in cross section connected between the inner and outer pressure members, means to prevent rotation of said pressure members, and circumferentially spaced spring means between the pressure members to slide the outer pressure member away from the inner pressure member to force the packing into sealing engagement with the wheel face, said rim of the inner pressure member presenting a curved inner surface to the bight of the U-shaped sealing annulus, whereby said curved surface and bight have sealing engagement.

4. A seal structure between a stationary journal hub part and a wheel rotatable with a shaft passed through said journal hub part, said wheel having a rim overhanging and extending around the journal hub part in spaced relation to leave an annular space in which the seal structure is located, the seal structure comprising an inner pressure member surrounding the hub part, a pin lock between the hub part and inner pressure member to prevent rotation of the latter, an outer pressure member slidably surrounding the hub part and spaced laterally of the inner pressure member on the hub part, a packing element between a face of the wheel and the inner pressure member, expansible and flexible sealing means connected between the inner and outer pressure members, circumferentially spaced studs carried by the pressure members in aligned pairs, and a spring carried by each pair of studs to slide the outer pressure member away from the inner pressure member to force the packing into sealing engagement with the wheel face.

In testimony whereof we affix our signatures.

DAVID B. BAKER.
NORMAN O. PANZEGRAU.